J. L. NEWELL.
PNEUMATIC TIRE.
APPLICATION FILED NOV. 23, 1907.
908,488.
Patented Jan. 5, 1909.
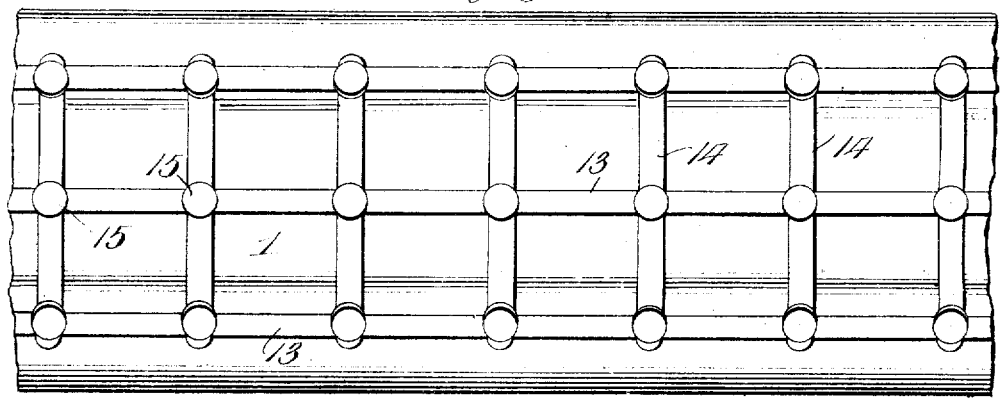
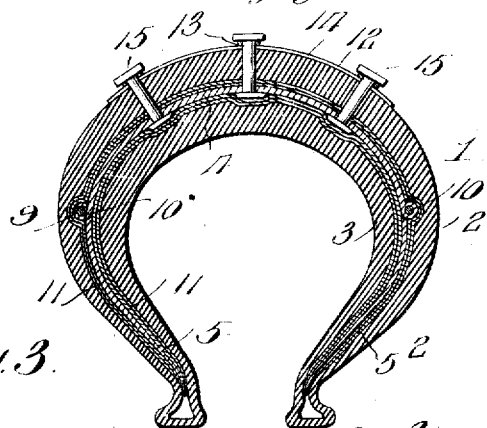
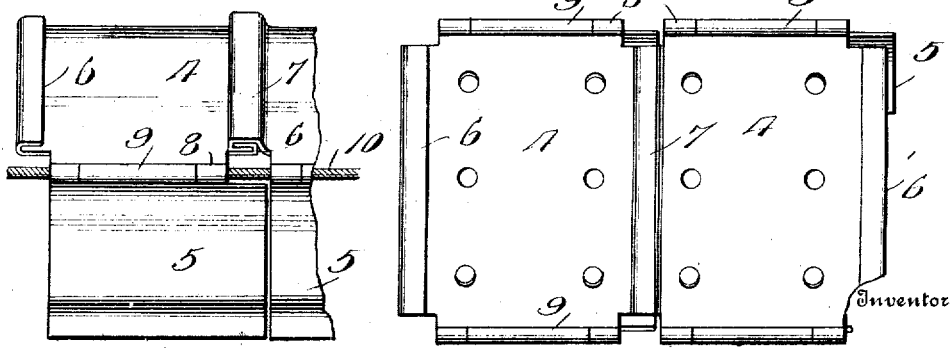
Witnesses
Frank Hough
J. W. Garner
Inventor
James L. Newell,
By
Victor J. Evans
Attorney

UNITED STATES PATENT OFFICE.

JAMES L. NEWELL, OF SOUTH BEND, INDIANA.

PNEUMATIC TIRE.

No. 908,488.  Specification of Letters Patent.  Patented Jan. 5, 1909.

Application filed November 23, 1907. Serial No. 403,472.

*To all whom it may concern:*

Be it known that I, JAMES L. NEWELL, a citizen of the United States, residing at South Bend, in the county of St. Joseph and State of Indiana, have invented new and useful Improvements in Pneumatic Tires, of which the following is a specification.

This invention relates to improvements in pneumatic tires, particularly tires of that class which are used on the wheels of automobile vehicles, and the said invention consists in the construction, arrangement and combination of devices hereinafter described and claimed.

One object of my invention is to provide novel means to prevent the tire from being punctured.

Another object is to provide means to protect the periphery of the tire from excessive wear.

A further object is to provide means for strengthening the construction of the tire.

In the accompanying drawings, Figure 1 is a plan of a portion of the periphery of a tire constructed in accordance with my invention. Fig. 2 is a transverse sectional view of the same. Fig. 3 is a detail elevation of the reinforced plates which are embodied in the fabric of the tire. Fig. 4 is a plan of the same.

In accordance with my invention, the tire 1 which is made of rubber or other suitable material or of rubber reinforced with canvas or other suitable fabric and which is here shown as of substantially horse-shoe shape cross-sectionally, but may be of any other suitable shape, comprises an outer portion 2 and an inner portion 3. In the space between said outer and inner portions is an armor which comprises plates 4 and 5. The plates 4 are curved transversely to conform to the shape of the outer portion of the tire and are provided at their ends with rolled portions 6, which form interlocking hooks 7 so that the said plates 4 are detachably connected together end for end. The said plates 4 are made of suitable metal, such for instance, as sheet aluminum of any suitable thickness and are provided at their. sides with hinge members 8. The side plates 5 are provided with hinge members 9 which aline with the hinge members 8 of the plates 4 and like said hinge members 8 are tubular in form. Cords 10, which in practice are steel cables, pass through the said tubular hinge members of the plates 4, 5, form the pintles therefor whereby the plates 5 are connected to the plates 4 for angular movement, and the said steel cables or cords pass entirely around the tire and lie concentrically with reference to the wheel and serve not only the function of pivotally connecting the plates 4 and 5 together, but also to effectually reinforce the tire.

It will be observed upon reference to Fig. 2 of the drawings that owing to the pivotal connections between the plates 4 and 5, the said plates are adapted to turn angularly with respect to one another as may be required by the flexion of the tire under stress, so that the said plates which constitute a reinforcing armor embedded in the tire conform to the distortion of the shape of the tire when the same is in use. The said armor plates also serve to greatly strengthen the tire and impart to such a degree of rigidity thereto as to greatly enhance its efficiency. The said armor plates are, in the embodiment of the invention here shown, covered on their inner and outer sides with flexible waterproof fabric 11 which is preferably of rubber, but may be of any other suitable fabric.

On the tread or peripheral face of the tire is an anti-skidding armor 12 which consists of strips 13 of suitable metal which extend annularly around the tire in line with the plane thereof and transversely disposed strips 14 which are also made of suitable metal, preferably sheet steel. The said exterior armor strips 13, 14 are here shown as connected together at their points of intersection and as also connected to the interior armor consisting of the plates 4, 5, by means of rivets 15. Any other suitable means may, however, be employed to secure the inner armor and the outer armor in place and I do not desire to limit myself in this particular.

It will be understood that the inner armor which is embedded in the tire, in addition to strengthening the construction thereof and imparting a desirable degree of rigidity thereto, also serves to prevent the tire from being punctured.

Having thus described the invention, what I claim as new and desire to secure by Letters Patent is:—

1. A tire having an inner armor embedded therein and comprising central plates and side plates, said central and side plates having coacting hinge devices at their opposing sides, and said central plates also having outstanding reversely bent ends forming interlocking hook portions at the ends of said central plates, detachably connecting said central plates together end for end, said interlocking hook portions being out of line with the coacting hinge members of the central and side plates, and means coacting with the hinge members of the side and central plates to connect the side plates to the central plates for angular movement with reference thereto.

2. A tire of the class described having an inner armor and an outer anti-skidding device, said anti-skidding device comprising strips extending parallel with the tire and transversely disposed strips connecting the first mentioned strips together, and securing means for the strips of the anti-skidding device, said securing means passing through said strips at the points of their intersection and also passing through the outer portion of the tire and secured to the inner armor to connect the inner armor and the anti-skidding device together.

In testimony whereof I affix my signature in presence of two witnesses.

JAMES L. NEWELL.

Witnesses:
W. D. OWEN,
RUDOLPH ACKERMAN.